United States Patent

Kreimer et al.

[11] 4,174,776
[45] Nov. 20, 1979

[54] VIBRATION CONVEYOR APPARATUS

[76] Inventors: Vladimir I. Kreimer, ulitsa Dershavina, 46, kv. 52; Anatoly Y. Tishkov, ulitsa Dershavina, 19, kv. 67; Vitaly M. Grigoriev, ulitsa Tankovaya, 49, kv. 7; Ljudmila I. Gendlina, ulitsa Pisareva, 4, kv. 64; Leonid V. Zimonin, ulitsa Borisa Bogatkova, 247, kv. 10, all of Novosibirsk, U.S.S.R.

[21] Appl. No.: 728,777

[22] Filed: Oct. 1, 1976

Related U.S. Application Data

[63] Continuation of Ser. No. 531,335, Dec. 10, 1974, abandoned.

[51] Int. Cl.² ............................................. B65G 27/00
[52] U.S. Cl. .................................... 198/771; 198/752
[58] Field of Search ............... 198/750, 752, 758, 766, 198/771; 193/2 A, 25 R, 25 A, 25 S

[56] References Cited

U.S. PATENT DOCUMENTS

| 905,865 | 12/1908 | Frister | 198/771 |
|---|---|---|---|
| 1,919,086 | 7/1933 | Andreas | 198/766 |
| 2,646,867 | 7/1953 | Bebinger | 198/771 |
| 2,725,984 | 12/1955 | Klemencic | 198/771 |
| 3,091,368 | 5/1963 | Harley et al. | 222/206 |
| 3,101,831 | 8/1963 | Gaddini | 198/771 |
| 3,162,293 | 12/1964 | Loveland | 198/771 |
| 3,228,517 | 1/1966 | Yeasting | 198/771 |
| 3,604,555 | 9/1971 | Cowper | 198/763 |

FOREIGN PATENT DOCUMENTS

| 599119 | 5/1960 | Canada | 198/763 |
|---|---|---|---|
| 533440 | 8/1931 | Fed. Rep. of Germany | 198/758 |
| 546496 | 2/1932 | Fed. Rep. of Germany | 198/752 |
| 1073387 | 2/1956 | Fed. Rep. of Germany | 198/758 |
| 812033 | 4/1959 | United Kingdom | 198/766 |

Primary Examiner—Joseph E. Valenza
Attorney, Agent, or Firm—Holman & Stern

[57] ABSTRACT

The apparatus is distinguished by that the bent boards of a feeding trough are connected to each other and to a vibrator above the bottom wall of the trough.

2 Claims, 5 Drawing Figures

VIBRATION CONVEYOR APPARATUS

This is a continuation of application Ser. No. 531,335 filed Dec. 10, 1974, now abandoned.

BACKGROUND OF THE INVENTION

The invention relates to vibration conveyor apparatus, and in particular to the apparatus to be used for feeding granular materials along inclined channels.

More specifically, the invention relates to the feeding of granular rocks to be fed after the mining along inclined mining excavations, as well as to the feeding of any granular materials from an upper level to a lower level along special channels.

At present, it is well known that belt, scraper, plate and pendulum conveyors are used for feeding rocks along inclined mining excavations.

The disadvantage of the belt and scraper conveyors resides in their unreliable operation under the above-mentioned conditions due to a rapid wear of belts and troughs of the conveyors as well as due to the expulsion of traction chains from the troughs.

The disadvantage of the plate and pendulum conveyors consists in a large labour consumption required for their assembly and disassembly, as well as their large size, which makes them operable only in the excavations having a considerable cross-sectional area, normally of at least 5 $m^2$.

It is also known to use for the above-mentioned purposes vibration conveyor apparatus comprising a vibration trough cambered in the direction from the forward loading end towards the rearward discharge end with the camber down.

This trough is provided with a means for cantilevering it in a channel and is connected to a vibrator (of. USSR Inventor's Certificate No. 275835, Cl. 81e, 51).

During the feeding, the material moves from the top down along a smoothly concave surface.

The main disadvantage of such apparatus consists in the fact that they are applicable on short lengths only, normally not exceeding 5 m due to the above-described concavity of the working surface of the trough.

There are also known vibration conveyor apparatus having a trough disposed axially along the flow path of the material being fed. Among these apparatus there should be mentioned such which have the bottom portion of the trough of a convex shape with the convexity directed inwardly of the trough, probably with a view to intensifying the stirring in the trough. The camber of the bottom wall is controlled by means of hydraulic jacks serving to support the vibration trough on the bottom of the excavation (of. the German Federal Republic Pat. No. 1189452, Cl. 81e, 52).

The common disadvantage of these apparatus consists in their unreliable operation due to a rapid failure of hydraulic jacks and resilient support members taking-up heavy loads of the frame weight.

In addition, the apparatus having the trough bottom wall with the convexity directed inwardly of the trough are complicated in the manufacture and maintenance due to the intricate shape of the troughs and employment of the system of hydraulic support jacks described above.

All the above-mentioned disadvantages impair the reliability of operation of such conveyor apparatus.

There are also known vibration conveyor apparatus to be used for the above-mentioned purposes comprising a vertically triangular frame supported on the bottom of an excavation by resilient members, and a base. A vibrator is mounted within the frame. A receiving trough and a feeding trough are sequentially arranged on the inclined side of the frame along the direction of flow of the material being fed (cf. German Pat. No. 711362, Cl. 81e, 51).

These apparatus are disadvantageous because of their large size and unreliable operation due to a rapid wear of the elastic members taking up heavy loads of the frame weight during the operation.

It is known to use for feeding materials in underground excavations scraper arrangements which are unreliable due to a rapid wear of ropes and unproductive when feeding materials along mining excavations of a considerable length.

OBJECT AND SUMMARY OF THE INVENTION

The main object of the invention is to provide an apparatus which is more reliable in operation, has a prolonged service life and is more efficient. In addition, it is an object of the invention to provide a compact apparatus which can be used in channels having small cross-sectional areas, e.g. smaller than 5 $m^2$.

Other objects of the invention consist in the provision of simple assembly and disassembly of the apparatus inside the channel and the possibility of feeding materials in channels of any desired length.

Other objects and advantages of the invention will become apparent from the following description.

The above objects are accomplished by that in a vibration conveyor apparatus for feeding granular materials along inclined channels comprising a trough arranged axially along a flow path of the material to be fed adapted to be cantilevered in an inclined channel and connected to a vibrator, according to the invention, the bent boards of the trough are connected to each other and to the vibrator above the bottom wall of the trough.

This construction provides for a more intensive feeding of a material along the trough.

More specifically, the bent boards of the trough may be interconnected by means of an intermediate member, the vibrator being mounted on the intermediate member.

The bent boards of the trough may also be interconnected by means of the vibrator.

BRIEF DESCRIPTION OF THE DRAWING

The invention will now be described in detail with reference to specific embodiments thereof illustrated in the accompanying drawings, in which:

FIG. 5 shows a longitudinal section of the detail of cantilevering of the feeding trough of the apparatus for all embodiments of the invention.

DETAILED DESCRIPTION OF PREFERRED EMBODIMENTS

Figure 1:
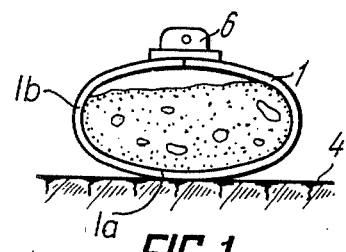
FIG. 1 shows a front elevation of a vibration conveyor apparatus for feeding granular materials along inclined channels according to the invention.

The apparatus comprises a feeding trough 1 having a bottom portion 1a and curved side portions ob (FIGS. 1 to 5) arranged axially along the flow path of the material to be fed.

The trough 1 is anchored to the bottom of an excavation by means of an angle support 2 (FIG. 5) received in a recess 3 made in the bottom 4 of the excavation (FIGS. 1 to 5). The trough 1 is fixed by the support 2 bearing against the wall of the recess 3 through a resilient member 5 under gravity.

Figure 4:
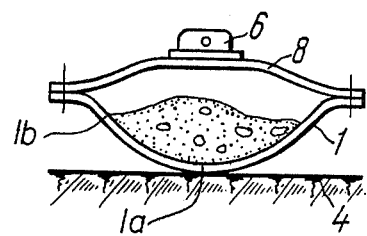
FIG. 4 shows a front elevation of one more embodiment of the apparatus.
Figure 2:
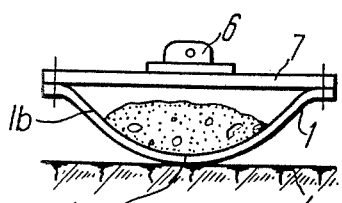
FIG. 2 is a front elevation of another embodiment of the apparatus.

The bent boards of the trough are connected to each other above the bottom portion 1a of the trough and to a vibrator 6 (FIGS. 1 to 4). The boards of the trough may be directly interconnected, and the vibrator 6 may be mounted at the joint between the boards of the trough. In accordance with another embodiment the boards of the trough may be interconnected by means of an intermediate member, the vibrator 6 being placed on the intermediate member. In this case, the intermediate member may be made as a plate 7 (FIG. 2); in another case, the intermediate member may be formed as a spring 8 (FIG. 4). The intermediate member comprising the plate 7 is movably connected to the boards of the trough in the horizontally transverse direction with respect to the direction of feeding of the material. The spring 8 is rigidly connected to the boards of the trough.

Figure 3:
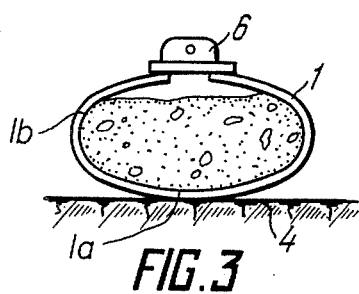

In addition, the boards of the trough may be interconnected by means of the vibrator 6 (FIG. 3).

The advantage of all the above-described embodiments of the apparatus resides in the fact that during the operation of the vibrator, various oscillation modes occur in the trough resulting from the bending and unbending of the trough boards and deformation of the resilient support.

Due to such a complete utilization of the resilient properties of the trough, the oscillations of the trough 1 are intensified and the feeding of a material is likewise intensified, while the throughput capacity of the apparatus is improved and the effective cross-sectional area of the trough is increased so that the material being fed is prevented from being expelled from the trough as a result of intensification of the oscillations of the trough 1.

The above-described apparatus may be installed as a single piece of equipment, or a plurality of such apparatus may be installed depending on the feeding length required.

The apparatus may be successfully used both in closed inclined channels, e.g. in underground excavations, and in open channels, e.g. on trestles and the like.

Figure 5:
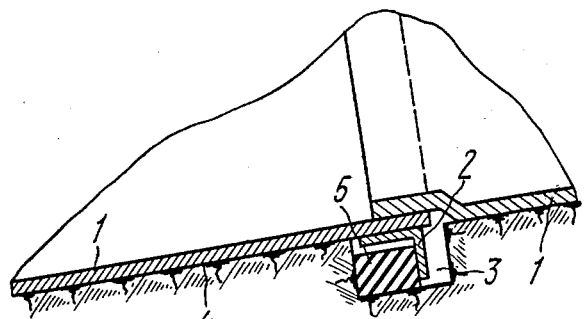
FIG. 5 is a front elevation of a further embodiment of the same apparatus.

In all cases the trough may be cantilevered as described above or in any other appropriate manner.

Where a plurality of apparatus are installed in a sequence, the troughs are mounted in such a manner that they partially overlap each other at the joints between the apparatus as shown in FIG. 5.

After the vibrators are put in operation an intensive feeding of a material begins from one trough to another along the entire feeding length.

The material is fed over the entire cross-section of the trough.

What is claimed is:

1. A vibration conveyor apparatus for feeding granular materials along an inclined channel in a mining excavation having a floor surface comprising:
    a flexible and resilient conveying member shaped as a trough having a bottom portion, and curved side portions arranged axially along the flow path of the material to be fed, said member resting on said floor surface and being anchored in at least one point of said inclined channel, said material being conveyed in said bottom portion; and
    means for interconnecting said side portions comprising a vibrator.

2. The apparatus of claim 1 wherein said means further comprises an intermediate member.